(12) United States Patent
Liang et al.

(10) Patent No.: US 11,442,551 B2
(45) Date of Patent: Sep. 13, 2022

(54) KEYBOARD FRAME AND KEYBOARD

(71) Applicant: LITE-ON Technology (Chang Zhou) Co., LTD., Jiangsu Province (CN)

(72) Inventors: XiaoQiang Liang, Jiangsu Province (CN); Lei Shi, Jiangsu Province (CN); Wenjie Yu, Jiangsu Province (CN)

(73) Assignee: LITE-ON Technology (Chang Zhou) Co., LTD., Jiangsu Province (CN)

( * ) Notice: Subject to any disclaimer, the term of this patent is extended or adjusted under 35 U.S.C. 154(b) by 0 days.

(21) Appl. No.: 16/953,025

(22) Filed: Nov. 19, 2020

(65) Prior Publication Data

US 2021/0349545 A1   Nov. 11, 2021

(30) Foreign Application Priority Data

May 6, 2020   (CN) .......................... 202010372876.4

(51) Int. Cl.
  *G06F 3/02*   (2006.01)
(52) U.S. Cl.
  CPC .................................. *G06F 3/0202* (2013.01)
(58) Field of Classification Search
  CPC ..... G06F 3/0202; G06F 1/1664; G06F 1/1662
  See application file for complete search history.

(56) References Cited

U.S. PATENT DOCUMENTS

| 2014/0313656 A1* | 10/2014 | Tsao | G06F 3/0202 |
| | | | 361/679.08 |
| 2017/0131742 A1* | 5/2017 | Tamura | G06F 1/1616 |
| 2021/0011521 A1* | 1/2021 | Chang | F16H 21/54 |

FOREIGN PATENT DOCUMENTS

CN          101625594 B      6/2012

OTHER PUBLICATIONS

China Patent Office, First Office Action, dated Oct. 20, 2021, 2 pages.

* cited by examiner

*Primary Examiner* — Amit Chatly
(74) *Attorney, Agent, or Firm* — Umberg Zipser LLP; Ryan Dean (57) ABSTRACT

A keyboard frame and a keyboard are provided. The keyboard frame comprises a frame body and a plurality of positioning members. The frame body comprises a plurality of keyswitch orifices, a frame and a housing. The housing is disposed on a surface of the frame. The frame comprises a plurality of positioning notches. The housing is exposed from the plurality of positioning notches. The plurality of positioning members is disposed on the housing, and is disposed in the plurality of positioning notches. The keyboard frame is assembled with a keyswitch module disposed on a frame. The keyswitch module comprises a plurality of keyswitches and a plurality of positioning holes. The plurality of the keyswitches passes through the plurality of key orifices. The plurality of positioning members is embedded into the plurality of positioning holes, uniforming the gap between the edge of each keyswitch and the edge of the keyswitch orifices.

12 Claims, 11 Drawing Sheets

KEYBOARD FRAME AND KEYBOARD

CROSS REFERENCE TO RELATED APPLICATION

This application claims the priority benefit of Chinese Patent Application Serial Number 202010372876.4, filed on May 6, 2020, the full invention of which is incorporated herein by reference.

BACKGROUND

Technical Field

The present invention relates to the technical field of input devices, particularly to a keyswitch frame and a keyboard.

Related Art

The keyswitch module of a conventional laptop computer is generally assembled in an order of stacking a metal base plate, a thin film circuit, an elevating component, and keycaps. The keyswitch module would be then assembled with a keyswitch frame which is lightweight and protective. The keyswitch frame comprises a combination of a metal housing and a plastic frame disposed on an inner surface of the metal housing. After the positioning columns of the plastic frame are mated with the positioning holes of the keyswitch module, the keycaps of the keyswitch module can be installed onto the keyswitch orifices of the housing to finalize a complete keyboard.

However, the plastic frame is generally manufactured by injection molding, whose size is greatly affected by the molding process. In addition, when the plastic frame and the housing are assembled into a keyswitch frame, there would be errors to the relative positions between the positioning columns of the plastic frame and the keyswitch orifices of the housing during the assembling process. Furthermore, when assembling the keyswitch frame to the keyswitch module, there would also be errors to the relative positions between the positioning columns of the plastic frame and the positioning holes of the keyswitch module during the assembling process. Thus, there would be greater errors during the assembling of the keyswitch orifices of the housing with the keyswitches of the keyswitch module, causing the gap between the edge of each keyswitch and the edge of each keyswitch orifice to be inconsistent. This would have a direct visual effect on the keyboard, even to a problem that keyswitches could not be embed into the keyswitch orifice.

SUMMARY

The embodiments of the present invention provide a keyboard frame and a keyboard to solve the problem of the uneven gap between a keyswitch and a keyswitch orifice when a keyswitch module of a keyboard is assembled to a keyboard frame.

On the first aspect, the present invention provides a keyboard frame, comprising a frame body and a plurality of positioning members. The frame body comprises a plurality of keyswitch orifices, a frame and a housing. The housing is disposed on the frame. The frame comprises a plurality of positioning notches. The housing is exposed from the plurality of positioning notches. The plurality of positioning members is disposed on the housing, and is disposed in the plurality of positioning notches.

On the second aspect, the present invention provides a keyboard comprising a keyboard frame of the first aspect and a keyswitch module. The keyswitch module is disposed on the frame, comprising a plurality of keyswitches and a plurality of positioning holes. The plurality of the keyswitches passes through the plurality of key orifices. The plurality of positioning members is embedded in the plurality of positioning holes.

In the embodiment of the present invention, the plurality of positioning members of the keyboard frame and the housing are two independent components. The position of the plurality of positioning members on the housing can be adjusted according to actual situations to solve the problem of an uneven gap between the keyswitch and the keyswitch orifice.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to", "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiment, the same reference numerals are used to refer to the same or similar elements throughout the invention.

Figure 1:
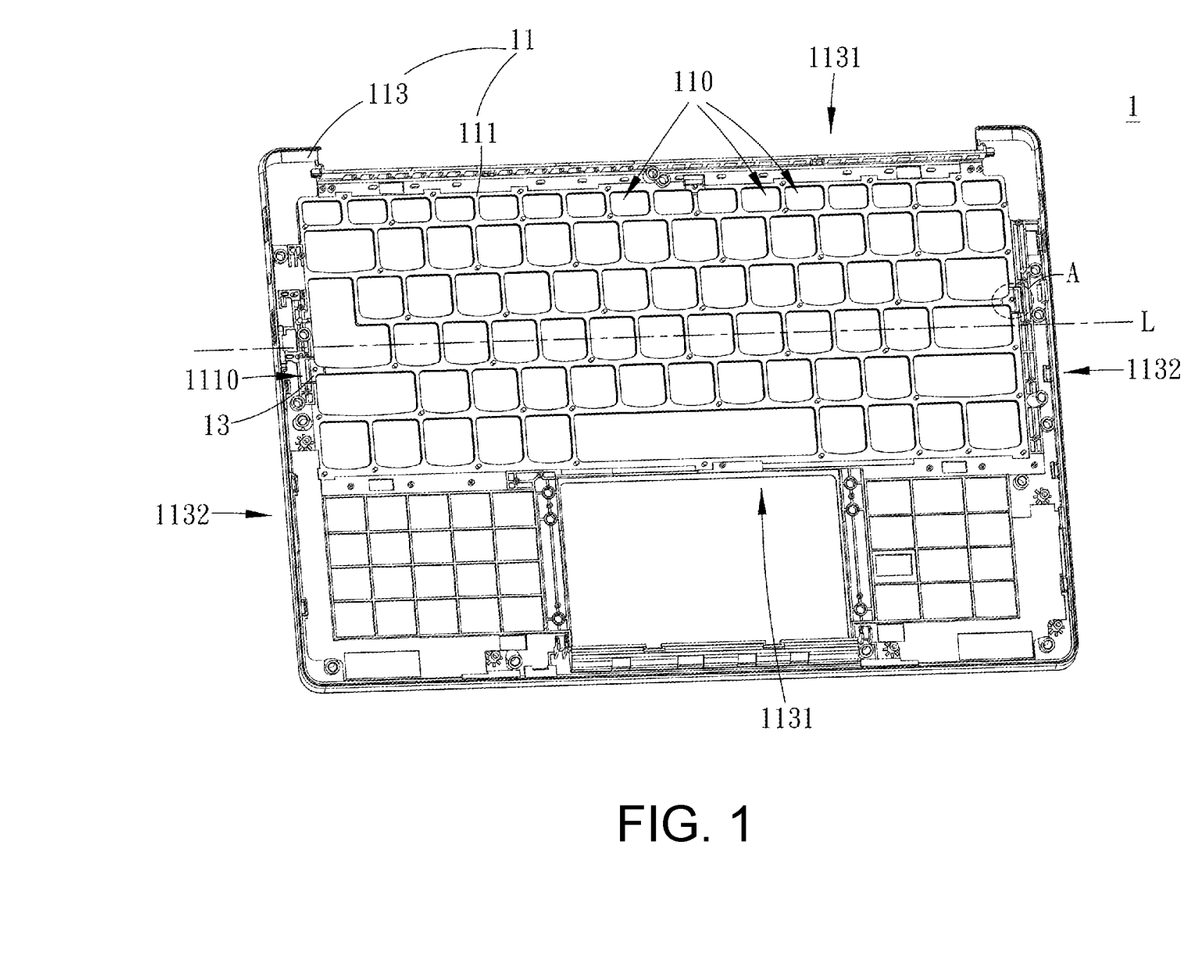
FIG. 1 is a perspective view of a keyboard frame of the first embodiment of the present invention.
Figure 2:
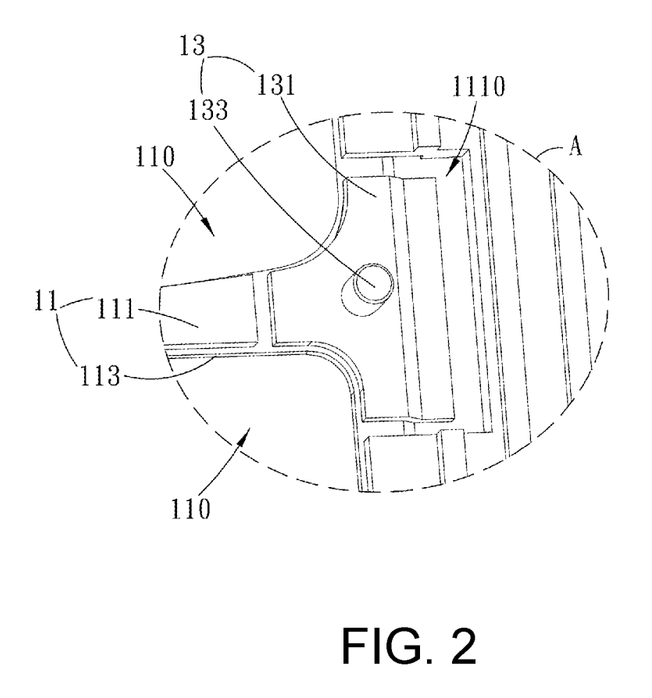
FIG. 2 is an enlarged view of area A in FIG. 1.
Figure 3:
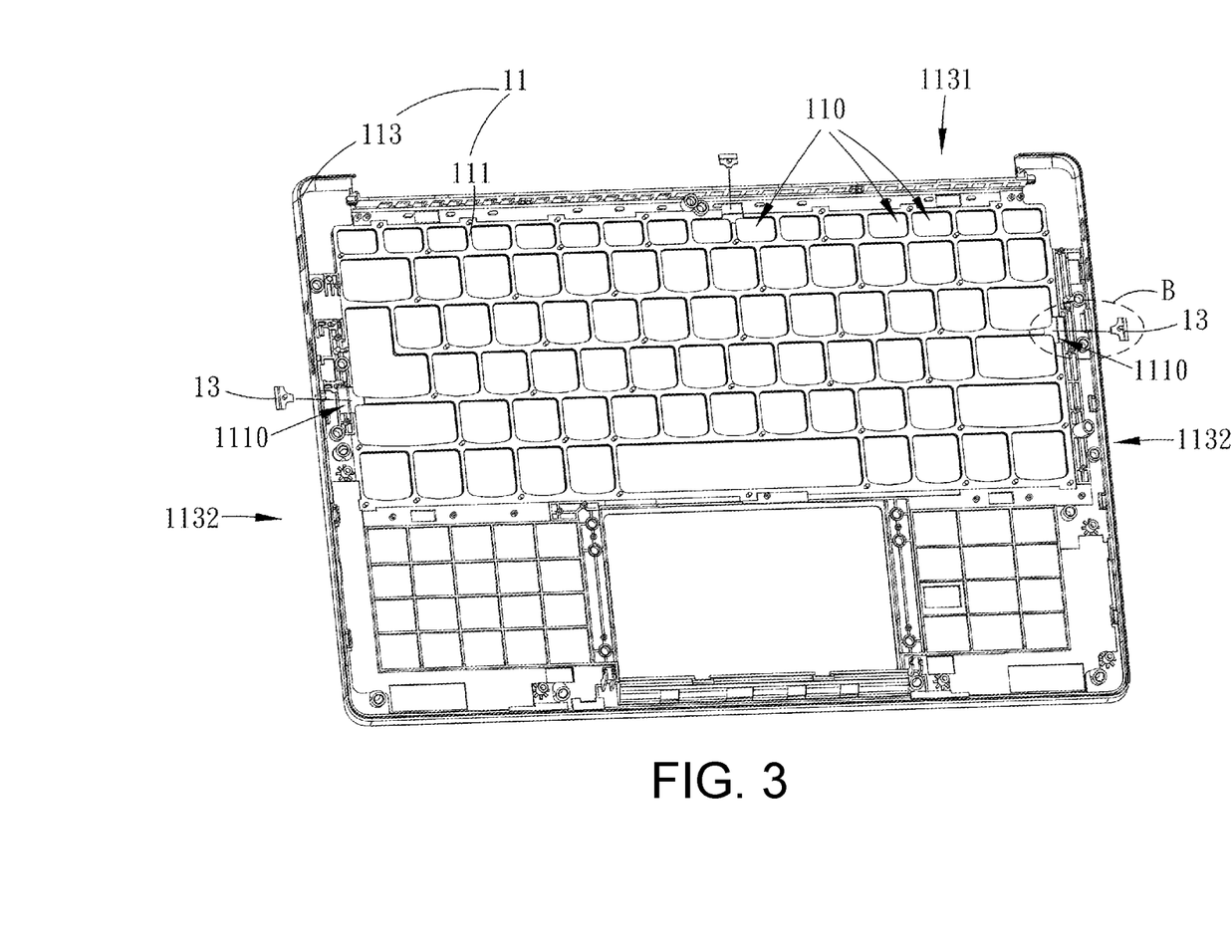
FIG. 3 is an exploded view of the keyboard frame and a positioning member of the first embodiment of the present invention.
Figure 4:
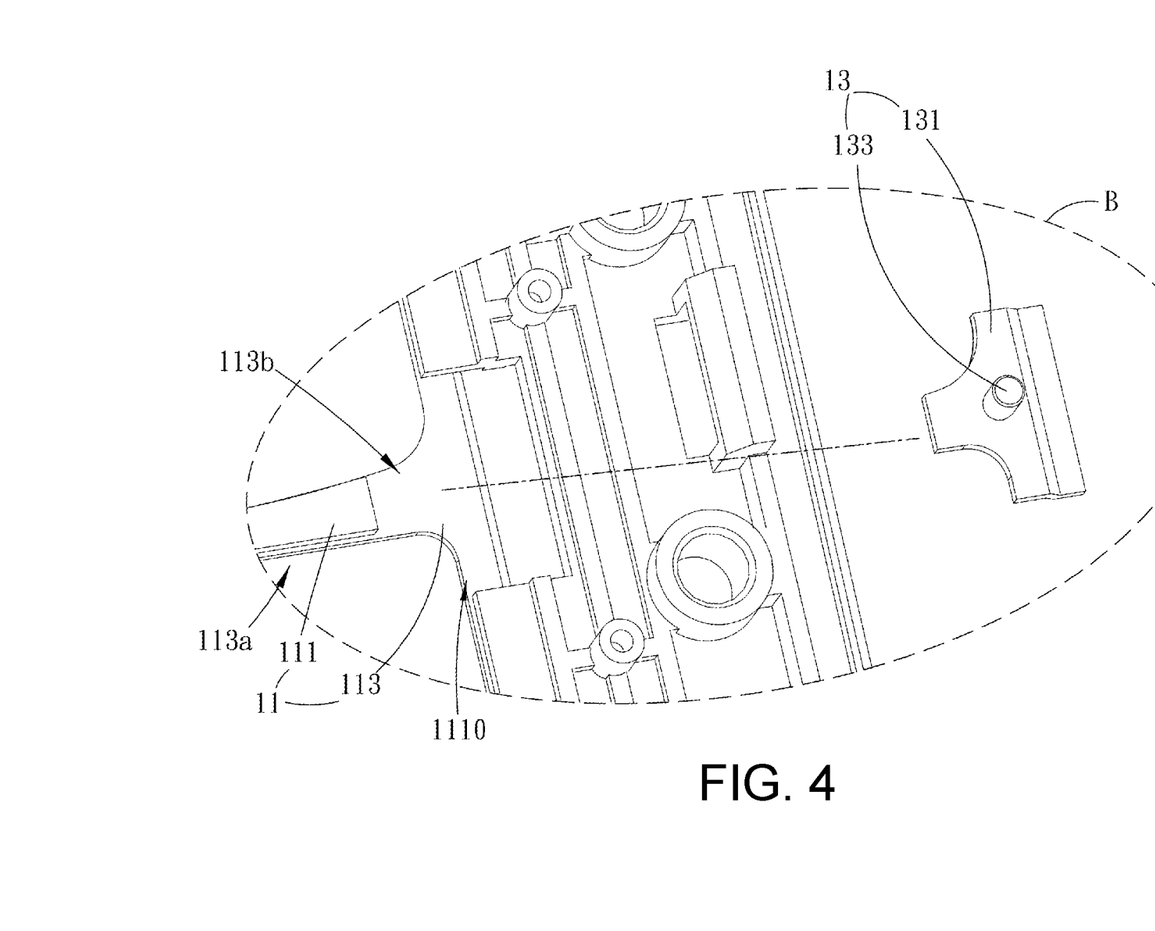
FIG. 4 is an enlarged view of area B in FIG. 3.
Figure 5:
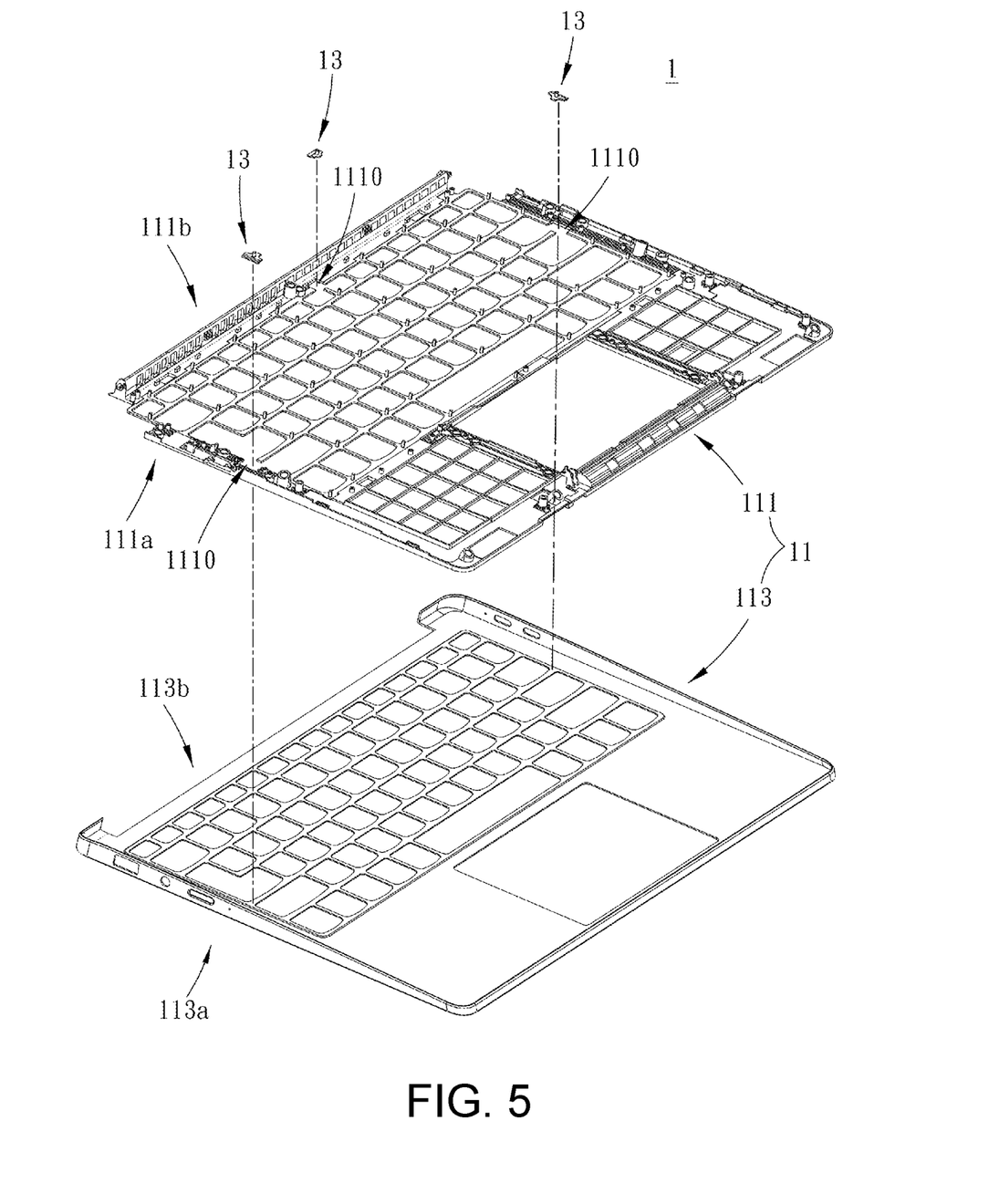
FIG. 5 is an exploded view of the keyboard frame and the positioning member of the first embodiment of the present invention.

FIG. 1 is a perspective view of a keyboard frame of the first embodiment of the present invention. FIG. 2 is an enlarged view of area A in FIG. 1. FIG. 3 is an exploded view of the keyboard frame and a positioning member of the first embodiment of the present invention. FIG. 4 is an enlarged view of area B in FIG. 3. FIG. 5 is an exploded view of the keyboard frame and the positioning member of the first embodiment of the present invention. As shown in the figure, the keyboard frame 1 of this embodiment comprises a frame body 11 and a plurality of positioning members 13. The frame body 11 comprises a plurality of keyswitch orifices 110, a frame 111 and a housing 113. The frame 111 comprises a first outer surface 111a and a first inner surface 111b opposite to the first outer surface 111a. The housing 113 comprises a second outer surface 113a and a second inner surface 113b opposite to the second outer surface 113a. The housing 113 is disposed on the frame 111. In this embodiment, the second inner surface 113b of the housing 113 is disposed on the first outer surface 111a of the skeleton 111. The frame 111 comprises a plurality of positioning notches 1110, each of the positioning notches 1110 penetrates the first outer surface 111a and the first inner surface 111b of the frame 111. The housing 113 is exposed from the positioning notch 1110. In this embodiment, the second inner surface 113b of the housing 113 is exposed from the positioning notch 1110. The plurality of positioning members 13 is disposed on the housing 113 and is disposed in the positioning notch 1110. That is, each of the positioning members 13 is disposed on the second inner surface 113b of the housing 113 exposed from the corresponding positioning notch 1110. The positioning member 13 of this embodiment comprises a positioning base 131 and a positioning column 133. The positioning base 131 is disposed on the second inner surface 113b of the housing 113 and is disposed in the positioning notch 1110. The positioning column 133 is disposed on the positioning base 131, protruding outward from the positioning notch 1110. That is, the positioning column 133 protrudes outward relative to the first inner surface 111b of the frame 111.

The positioning member 13 of this embodiment adheres to the second inner surface 113b of the housing 113 through an adhesive layer. It indicates that the adhesive layer is provided between the housing 113 and the positioning member 13, which also indicates that the positioning member 13 and the frame body 11 are two independent components. Thus, the position of the positioning member 13 on the housing 113 can be determined according to the positioning position of a keyswitch module to be assembled, allowing the frame body 11 to be accurately assembled onto the keyswitch module through a plurality of positioning members 13. The housing 113 of this embodiment is made of metal, and the positioning member 13 is also made of metal. So, metal glue is used as the material of the adhesive layer. Since the positioning member 13 is made of metal, which makes it less likely to be deformed during the assembly process and to maintain excellent assembly accuracy.

In this embodiment, the housing 113 comprises two first rims 1131 and two second rims 1132. The two first rims 1131 are oppositely disposed. The two second rims 1132 are oppositely disposed. The plurality of keyswitch orifices 110 is disposed between the two first rims 1131 and the two second rims 1132. The first rim 1131 of this embodiment is a border of the housing 113 on a longitudinal direction thereof. The second rim 1131 is a border of the housing 113 on a width direction thereof. In addition, the plurality of positioning members 13 of this embodiment is respectively disposed on one of the two first rims 1131 and the two second rims 1132. The positioning member 13 is a first rim 1131 disposed on the upper side of the housing 113, and is disposed at the center point on the first rim 1131. The two positioning members 13 on the two second rims 1132 are respectively close to the centerline L connecting the center points of the two second rims 1132 (FIG. 1), and the two positioning members 13 are disposed on two sides of the centerline. In other words, the two positioning members 13 are asymmetrically disposed. In this embodiment, the positioning member 13 of the second rim 1131 on the left side of the housing 113 is close to the first rim 1131 on the lower side of the housing 113. The positioning member 13 of the second rim 1131 on the right side of the housing 113 is close to the first rim 1131 on the upper side of the housing 113. The configuration of the positioning member 13 in this embodiment could restrict the relative movement between the housing 113 and the keyswitch module 21 (FIG. 9) assembled to the housing 113.

In this embodiment, there is a gap between a side of the positioning base 131 of the positioning member 13 and a sidewall of the positioning notch 1110. In this way, the position of the positioning member 13 in the positioning notch 1110 can be finely adjusted according to the positioning position of the keyswitch module to be assembled. Thus, the accuracy of the assembly of the keyboard frame 1 and the keyswitch module 21 can be improved. Taking the positioning notch 1110 and the positioning member 13 disposed on the second rim 1131 as examples, as shown in FIG. 2, the length of a sidewall of the positioning notch 1110 parallel to the second rim 1131 is longer than the length of a side of the positioning base 131 of the positioning member 13 parallel to the second rim 1131. The width of a sidewall of the positioning notch 1110 perpendicular to the second rim 1131 is greater than e width of a side of the positioning base 131 of the positioning member 13 perpendicular to the second rim 1131. Thus, there would be a gap between a side of the positioning base 131 of the positioning member 13 and a sidewall of the positioning notch 1110. The positioning member 13 can be finely adjusted in the corresponding positioning notch 1110, and the positioning position of the positioning member 13 in the positioning gap 1110 can be moved.

Figure 6:
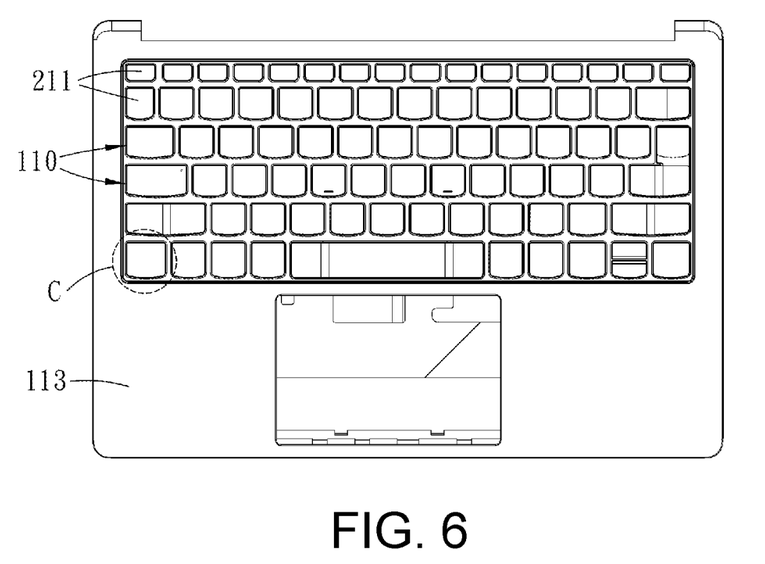
FIG. 6 is a front view of a keyboard of the present invention.
Figure 7:
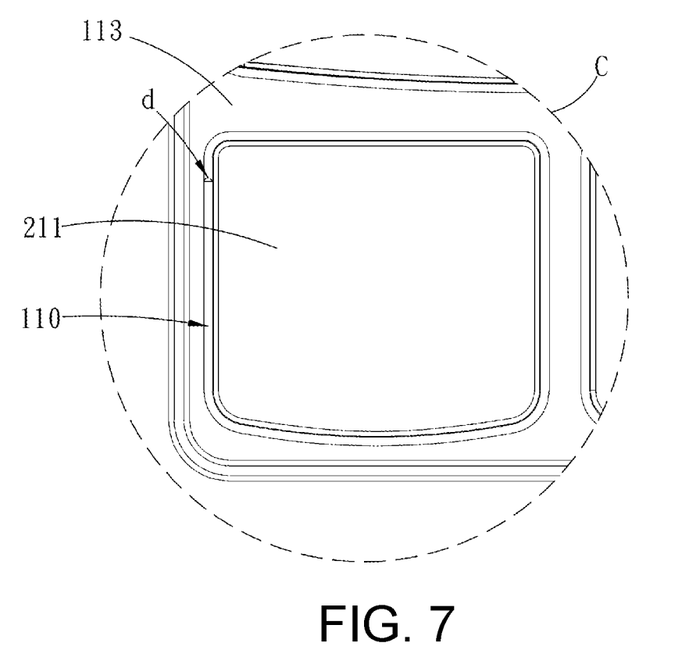
FIG. 7 is an enlarged view of area C in FIG. 6.
Figure 8:
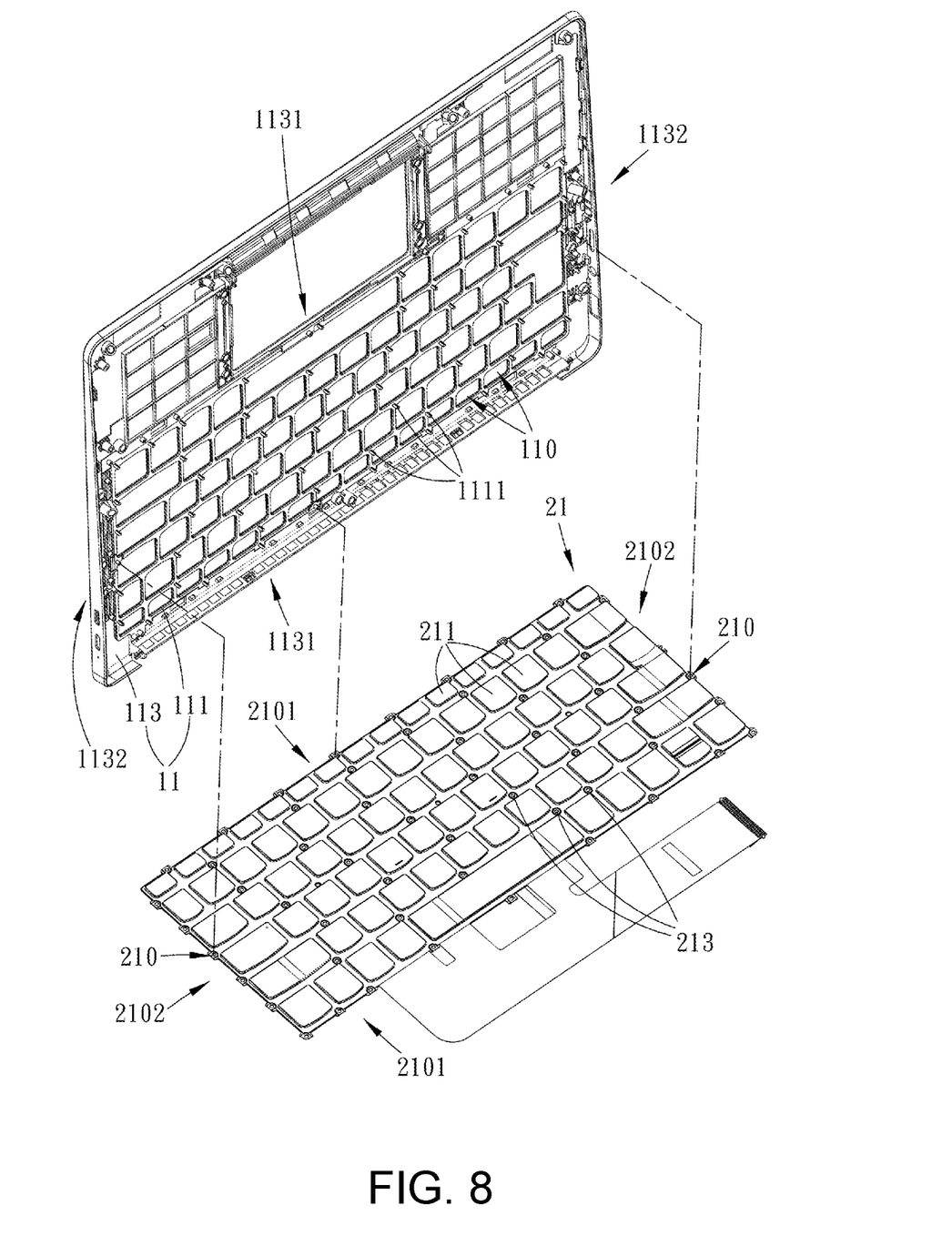
FIG. 8 is an assembly diagram of the keyboard frame and a keyswitch module of the first embodiment of the present invention.
Figure 9:
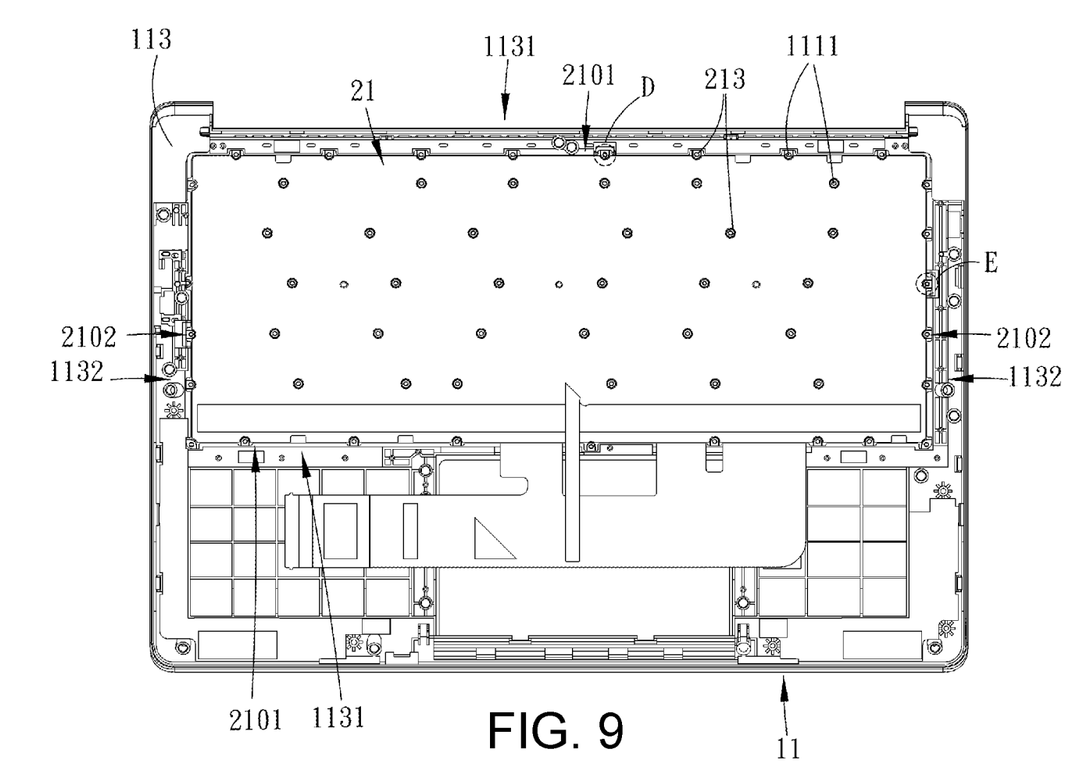
FIG. 9 is a rear view of a keyboard of the present invention.
Figure 10:
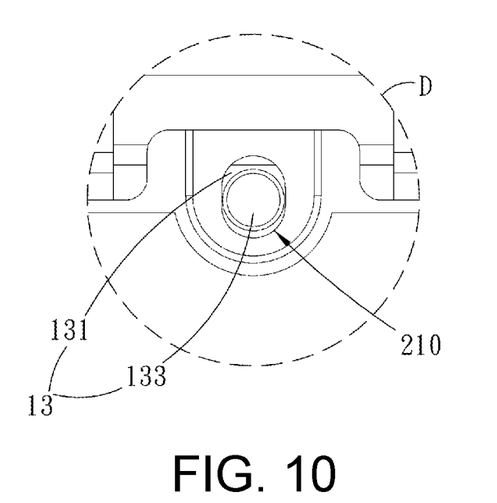
FIG. 10 is an enlarged view of area D in FIG. 9.
Figure 11:
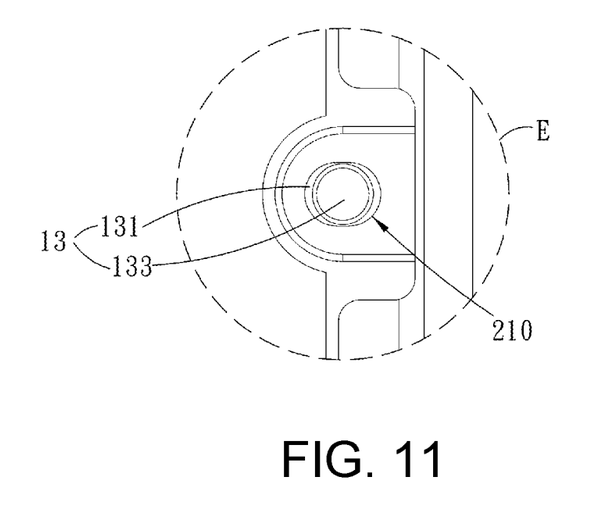
FIG. 11 is an enlarged view of area E in FIG. 9.

FIG. 6 is a front view of a keyboard of the present invention. FIG. 7 is an enlarged view of area C in FIG. 6. FIG. 8 is an assembly diagram of the keyboard frame and a keyswitch module of the first embodiment of the present invention. FIG. 9 is a rear view of a keyboard of the present invention. FIG. 10 is an enlarged view of area D in FIG. 9. FIG. 11 is an enlarged view of area E in FIG. 9. The keyboard 2 of this embodiment comprises the keyboard frame 1 and keyswitch module 21 described above. The keyswitch module 21 is disposed on the frame 111. That is, the keyswitch module 21 is disposed on a first inner surface 111b of the frame 111. The keyswitch module 21 comprises a plurality of keyswitches 211 and a plurality of positioning holes 210. When the keyswitch module 21 is disposed on the frame 111, the plurality of keyswitches 211 faces to the frame 111 and passes through the plurality of keyswitch orifices 110. The plurality of positioning members 13 is embedded into the plurality of positioning holes 210. The gap d between an edge of each of the keyswitches 211 and an edge of the keyswitch orifice 110 is uniformed.

In this embodiment, the keyswitch module 21 comprises two first sides 2101 and two second sides 2102. The two first sides 2101 are oppositely disposed. The two second sides 2102 are oppositely disposed. The plurality of keyswitches 211 is disposed between the two first sides 2101 and the two second sides 2102. The plurality of positioning holes 210 is disposed on the periphery of the plurality of the keyswitches 211. In this embodiment, the plurality of positioning holes 210 is adjacent to at least one of the two first sides 2101 and at least one of the two second sides 2102, respectively. The plurality of positioning holes 210 of the keyswitch module 21 of this embodiment is disposed correspondingly to the positioning member 13.

The keyboard frame 1 of this embodiment can locate a plurality of positioning members 13 on the housing 113 according to the positions of the plurality of positioning holes 210 and the plurality of keyswitches 211 of the keyswitch module 21. Then, the positioning member 13 can be positioned directly on the housing 113. In this way, when the keyboard frame 1 is assembled with the keyswitch module 21, the plurality of positioning members 13 is installed into the plurality of positioning holes 210 of the keyswitch module 21, so that each of the keyswitches 211 of the keyswitch module 21 is disposed in the corresponding keyswitch orifice 110, and the gap d between an edge of each of the keyswitches 211 and an edge of the keyswitch orifice 110 is uniformed. In other words, the plurality of positioning members 13 and the housing 113 of the keyboard frame 1 are two independent components. So, the installation positions of the plurality of positioning members 13 on the housing 113 can be adjusted according to actual situations, thereby reducing assembly errors. Therefore, the keyboard frame 1 can be accurately assembled onto the keyswitch module 21, uniforming the gap d between an edge of each of the keyswitches 211 of the keyswitch module 21 and an edge of the keyswitch orifice 110.

Furthermore, the positioning hole 210 on the first side 2101 is taken as an example for the following description. Referring to FIG. 9 and FIG. 10. the width of the positioning hole 210 on a first side 2101 parallel to the first side 2101 is substantially equal to the outer diameter of the positioning column 133 of the positioning member 13. The length of the positioning hole 210 on the first side 2101 perpendicular to the first side 2101 is greater than the outer diameter of the positioning column 133 of the positioning member 13. When the positioning column 133 of the positioning member 13 is disposed in the positioning hole 210 of the first side 2101, the displacement of the positioning column 133 in a direction parallel to the first side 2101 would be limited. The positioning column 133 would be having a displacement space in a direction perpendicular to the first side 2101. So the positioning column 133 of the positioning member 13 can be easily embedded into the positioning hole 210.

Similarly, the positioning hole 210 on the second side 2102 is taken as an example for the following description. Referring to FIG. 9 and FIG. 11, the width of the positioning hole 210 on the second side 2102 parallel to the second side 2102 is substantially equal to the outer diameter of the positioning column 133 of the positioning member 13. The length of the positioning hole 210 on the second side 2102 perpendicular to the second side 2102 is greater than the outer diameter of the positioning column 133 of the positioning member 13. When the positioning column 133 of the positioning member 13 is disposed in the positioning hole 210 of the second side 2102, the displacement of the positioning column 133 in a direction parallel to the second side 2102 would be limited. The positioning column 133 would be having a displacement space in a direction perpendicular to the second side 2102. So the positioning column 133 of the positioning member 13 can be easily embed into the positioning hole 210.

Back to FIG. 6, FIG. 8 and FIG. 9, in this embodiment, the frame 111 of the frame body 11 further comprises a plurality of engaging columns 1111. The keyswitch module 21 comprises a plurality of engaging holes 213. The plurality of engaging columns 1111 corresponds to the plurality of engaging holes 213. The diameter of each of the engaging holes 213 is greater than the outer diameter of each of the engaging columns 1111. In this embodiment, the bottom of the keyswitch module 21 is provided with a circuit board or a supporting board, etc. The plurality of engaging holes 213 is disposed on the circuit board or the supporting board. One end of the plurality of engaging columns 1111 passes through the plurality of engaging holes 213, wherein the engaging columns 1111 are, for example, hot melt columns, allowing the engaging columns 1111 to be secured to the bottom of the circuit board or supporting board by hot melting.

Figure 12:
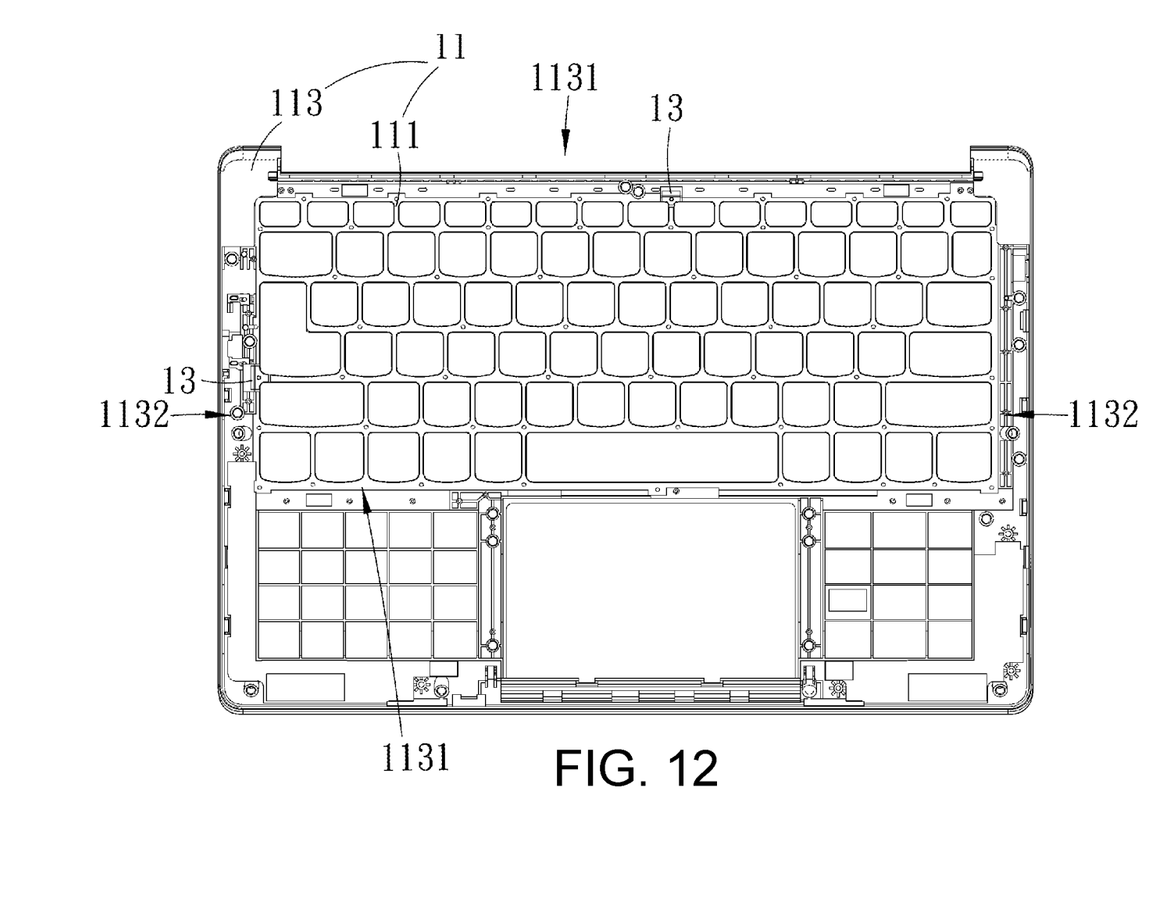
FIG. 12 is a perspective view of a keyboard frame of the second embodiment of the present invention.

FIG. 12 is a perspective view of a keyboard frame of the second embodiment of the present invention. As shown in the figure, the difference between this embodiment and the first embodiment is the number and position of the positioning members 13. In this embodiment, the plurality of positioning members 13 comprises two positioning members 13, which are respectively disposed in one of the two first rims 1131 and one of the two second rims 1132. That is, the positioning member 13 is only being as a positioning limit for the first rim 1131 and the second rim 1131.

Figure 13:
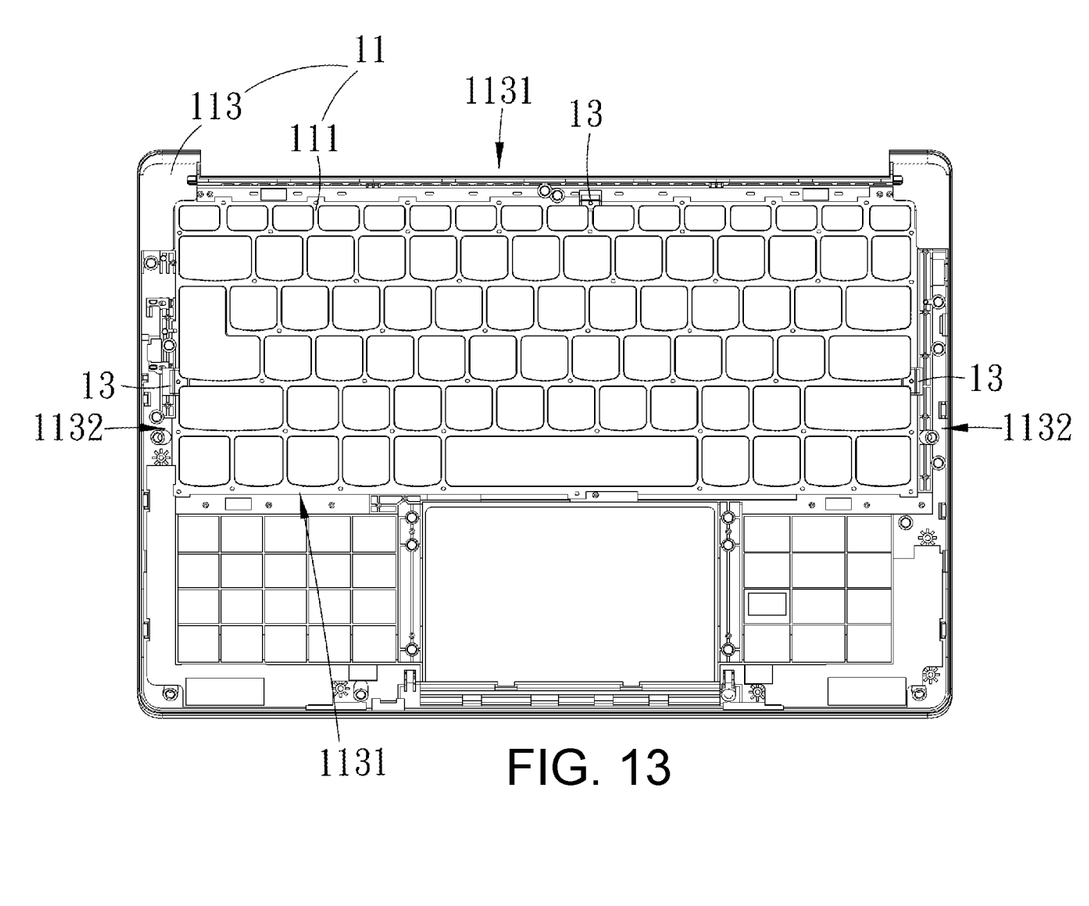
FIG. 13 is a perspective view of a keyboard frame of the third embodiment of the present invention.

FIG. 13 is a perspective view of a keyboard frame of the third embodiment of the present invention. As shown in the figure, the difference between this embodiment and the first embodiment is the installation position of the positioning member 13. In this embodiment, the plurality of positioning members 13 is respectively disposed on one of the two first rims 1131 and the two second rims 1132. The positioning member 13 on the first rim 1131 is disposed at the center point of the first rim 1131. The two positioning members 13 on the two second rims 1132 are respectively disposed at the center point of the second rims 1132. The two positioning members 13 are symmetrically disposed on the second rims 1132 on two sides.

In addition, in other embodiments, a plurality of positioning members 13 could be disposed on one of the two first rims 1131 and the two second rims 1132 (not shown). The two positioning members 13 on the two first rims 1131 are respectively close to the center of the first rims 1131, and the two positioning members 13 are disposed on different sides. In other words, the two positioning members 13 are disposed asymmetrically on the first rims 1131 on two sides. Furthermore, the two positioning members 13 of the two first rims 1131 can also be respectively disposed at the center of the first rims 1131. At this time, the two positioning members 13 are symmetrically disposed on the first rims 1131 on two sides.

The quantity and the location of the positioning members 13 are not limited to the present invention, which can be adjusted according to user requirements, the structural configuration of the keyboard frame 1 or/and the structural configuration of the keyswitch module 21.

In summary, the present invention proposed a keyboard frame and a keyboard, in which the plurality of positioning members of the keyboard frame and the housing are two independent components. The position of the plurality of positioning members on the housing can be adjusted according to actual situations to minimize errors during assembling, allowing the keyboard frame to be accurately assembled onto the keyswitch module, thereby uniforming the gap between the plurality of keyswitches and the keyswitch orifices of the keyboard frame.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A keyboard, comprising:
a keyboard frame, comprising:
a frame body comprising a plurality of keyswitch orifices, a frame and a housing, the housing being disposed on the frame, the frame comprising a plurality of positioning notches, the housing being exposed from the plurality of positioning notches;
a plurality of positioning members disposed on the housing, being disposed in the plurality of positioning notches; and
a keyswitch module disposed on the frame, comprising a plurality of keyswitches and a plurality of positioning holes, the plurality of the keyswitches passing through the plurality of keyswitch orifices, the plurality of positioning members being embedded into the plurality of positioning holes;
wherein each of the positioning notches has an extending portion, and each of the positioning notches communicates two keyswitch orifices through the extending portion.

2. The keyboard according to claim 1, wherein the keyswitch module comprises two first sides and two second sides; the two first sides are oppositely disposed; the two second sides are oppositely disposed; the plurality of keyswitches is disposed between the two first sides and the two second sides; the plurality of positioning holes is disposed on the periphery of the plurality of the keyswitches; the plurality of positioning holes is adjacent to at least one of the two first sides and at least one of the two second sides, respectively.

3. The keyboard according to claim 2, wherein the width of the positioning hole on the first side parallel to the first side is substantially equal to the outer diameter of the positioning column of the positioning member; the length of the positioning hole on the first side perpendicular to the first side is greater than the outer diameter of the positioning column of the positioning member.

4. The keyboard according to claim 2, wherein the width of the positioning hole on the second side parallel to the second side is substantially equal to the outer diameter of the positioning column of the positioning member; the length of the positioning hole on the second side perpendicular to the second side is greater than the outer diameter of the positioning column of the positioning member.

5. The keyboard according to claim 1, wherein each of the positioning members comprises a positioning base and a positioning column; the positioning base is disposed on the housing; the positioning base is disposed in the positioning notch; the positioning column is disposed on the positioning base; the positioning column protrudes outward from the positioning notch.

6. The keyboard according to claim 1, wherein the housing comprises two first rims and two second rims; the two first rims are oppositely disposed; the two second rims are oppositely disposed; the plurality of keyswitch orifices is disposed between the two first rims and the two second rims.

7. The keyboard according to claim 6, wherein the plurality of positioning members is disposed on one of the two first rims and one of the two second rims.

8. The keyboard according to claim 6, wherein the plurality of the positioning members is respectively disposed on one of the two first rims and the two second rims.

9. The keyboard according to claim 8, wherein the two positioning members disposed on the two second rims are respectively close to the center points of the two second rims; the two positioning members are respectively disposed on different sides of the centerline of the two second rims.

10. The keyboard according to claim 6, wherein the plurality of positioning members are respectively disposed on one of the two first rims and the two second rims.

11. The keyboard according to claim 10, wherein the two positioning members disposed on the two first rims are respectively close to the center points of the two first rims; the two positioning members are respectively disposed on different sides of the center lines of the two first rims.

12. The keyboard according to claim 1, wherein the housing and the positioning member are made of metal; the positioning member is disposed on the housing through an adhesive layer.

\* \* \* \* \*